US010509891B2

(12) United States Patent
Solow et al.

(10) Patent No.: US 10,509,891 B2
(45) Date of Patent: Dec. 17, 2019

(54) METHOD AND SYSTEM FOR CONTENT AND SERVICE SHARING

(71) Applicant: Cisco Technology, Inc., San Jose, CA (US)

(72) Inventors: Hillel Solow, Beit Shemesh (IL); Yossi Tsuria, Jerusalem (IL); Avraham Poupko, Jerusalem (IL); Shabtai Atlow, Efrat (IL)

(73) Assignee: Cisco Technology, Inc., San Jose, CA (US)

( * ) Notice: Subject to any disclaimer, the term of this patent is extended or adjusted under 35 U.S.C. 154(b) by 216 days.

(21) Appl. No.: 15/585,194

(22) Filed: May 3, 2017

(65) Prior Publication Data

US 2018/0322259 A1 Nov. 8, 2018

(51) Int. Cl.
 *H04L 29/06* (2006.01)
 *G06F 21/10* (2013.01)
 *H04L 9/08* (2006.01)
 *G06F 21/64* (2013.01)

(52) U.S. Cl.
 CPC ............ *G06F 21/105* (2013.01); *G06F 21/10* (2013.01); *G06F 21/645* (2013.01); *H04L 9/0819* (2013.01); *G06F 2221/0788* (2013.01); *G06F 2221/2151* (2013.01); *H04L 2209/603* (2013.01)

(58) Field of Classification Search
 CPC .................................................... G06F 21/105
 See application file for complete search history.

(56) References Cited

U.S. PATENT DOCUMENTS

| 10,176,308 B2* | 1/2019 | Mintz ................... H04L 9/3236 |
| 10,262,164 B2* | 4/2019 | Rodriguez De Castro ................. G06F 21/76 |
| 10,296,248 B2* | 5/2019 | Ateniese ............. G06F 16/1805 |
| 2015/0074397 A1* | 3/2015 | Dube ...................... G06F 21/10 713/168 |

(Continued)

FOREIGN PATENT DOCUMENTS

| EP | 002270734 | 1/2011 |
| GB | 2503210 | 12/2013 |

OTHER PUBLICATIONS

Fujimura, S. et al.; "BRIGHT: A concept for a decentralized rights management system based on blockchain," 2015 IEEE 5th International Conference on Consumer Electronics—Berlin (ICCE—Berlin), Berlin, 2015, pp. 345-346.

(Continued)

*Primary Examiner* — Harris C Wang
(74) *Attorney, Agent, or Firm* — Merchant & Gould P.C.

(57) ABSTRACT

In one embodiment, an instruction is received at a blockchain server from a first digital rights management (DRM) client, the instruction including an instruction to transfer a DRM license to an encrypted content item to a second DRM client. A block to be recorded in a blockchain, is created, the block including a content item ID of said encrypted content item, one of a device ID of a device including the second DRM client or a user ID of a user of the second DRM client, DRM license information for said DRM license, and a DRM decryption key for decrypting said encrypted content item. The block is recorded in the blockchain. A confirmation message is sent to the second DRM client confirming that the block was written to the blockchain. Related systems, methods, and apparatuses are also described.

20 Claims, 5 Drawing Sheets

(56) References Cited

U.S. PATENT DOCUMENTS

| | | | |
|---|---|---|---|
| 2015/0326563 A1* | 11/2015 | Chan | H04L 63/0823 |
| | | | 713/172 |
| 2016/0321676 A1* | 11/2016 | McCoy | G06Q 50/184 |
| 2016/0323109 A1 | 11/2016 | McCoy et al. | |
| 2016/0342977 A1 | 11/2016 | Lam | |
| 2017/0116693 A1* | 4/2017 | Rae | G06F 21/64 |
| 2017/0134161 A1* | 5/2017 | Goeringer | H04L 9/3236 |
| 2017/0177898 A1* | 6/2017 | Dillenberger | G06F 16/2379 |
| 2018/0054491 A1* | 2/2018 | Mankovskii | H04L 67/142 |
| 2018/0115416 A1* | 4/2018 | Diehl | H04L 9/0819 |
| 2018/0322259 A1* | 11/2018 | Solow | G06F 21/105 |

OTHER PUBLICATIONS

Iansiti, Marco et al.; "The Truth about Blockchain"; in Harvard Business Review, Jan.-Feb. 2017 Issue.

Shamir, Adi; How to Share a Secret, 1979. Commun. ACM 22. 11 (Nov. 1979), 612-613. DOI.

Wikipedia; "Shamir's Secret Sharing." Wikipedia, The Free Encyclopedia available at: https://en.wikipedia.org/w/index.php?title=Shamir%27s_Secret_Sharing&oldid=741659121 (accessed Sep. 28. 2016).

Wikipedia; "Digital Entertainment Content Ecosystem," Wikipedia, The Free Encyclopedia; available at https://en.wikipedia.org/w/index.php?title=Digital_Entertainment_Content_Ecosystem&oldid=723906343 (accessed Jun. 6, 2016).

\* cited by examiner

METHOD AND SYSTEM FOR CONTENT AND SERVICE SHARING

TECHNICAL FIELD

The present disclosure generally relates to digital rights management systems, apparatus, and methods.

BACKGROUND

The advent of digital media and analog-to-digital conversion technologies (especially those that are usable on mass-market general-purpose personal computers) has vastly increased the concerns of owners of digital content, including copyright-owners and organizations. These concerns are particularly prevalent within the music and movie industries, because these sectors are partly or wholly dependent on the revenue generated from such works.

A blockchain is a distributed database that maintains a continuously growing list of ordered records called blocks. Blocks typically contain a timestamp and a link to a previous block. By design, blockchains are inherently resistant to modification of the data—once recorded, the data in a block cannot be altered retroactively. Blockchains are "an open, distributed ledger that can record transactions between two parties efficiently and in a verifiable and permanent way. The ledger itself can also be programmed to trigger transactions automatically." (see Iansiti, et al, "The Truth About Blockchain". Harvard Business Review. Harvard University. January 2017.) Note that sometimes the term "blockchain" as found in the art is a compounded version of the term "block chain", which term might be found in earlier art.

As changes occur in a blockchain environment, for example, when transactions occur, records concerning ownership of assets are recorded in a first blockchain ledger. When changes are made to the first blockchain ledger, other copies of the blockchain ledger, located on other blockchain servers, are also updated to reflect the chain.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

In one embodiment, an instruction is received at a blockchain server from a first digital rights management (DRM) client, the instruction including an instruction to transfer a DRM license to an encrypted content item to a second DRM client. A block to be recorded in a blockchain, is created, the block including a content item ID of said encrypted content item, one of a device ID of a device including the second DRM client or a user ID of a user of the second DRM client, DRM license information for said DRM license, and a DRM decryption key for decrypting said encrypted content item. The block is recorded in the blockchain. A confirmation message is sent to the second DRM client confirming that the block was written to the blockchain. Related systems, methods, and apparatuses are also described.

Example Embodiment

Figure 1:
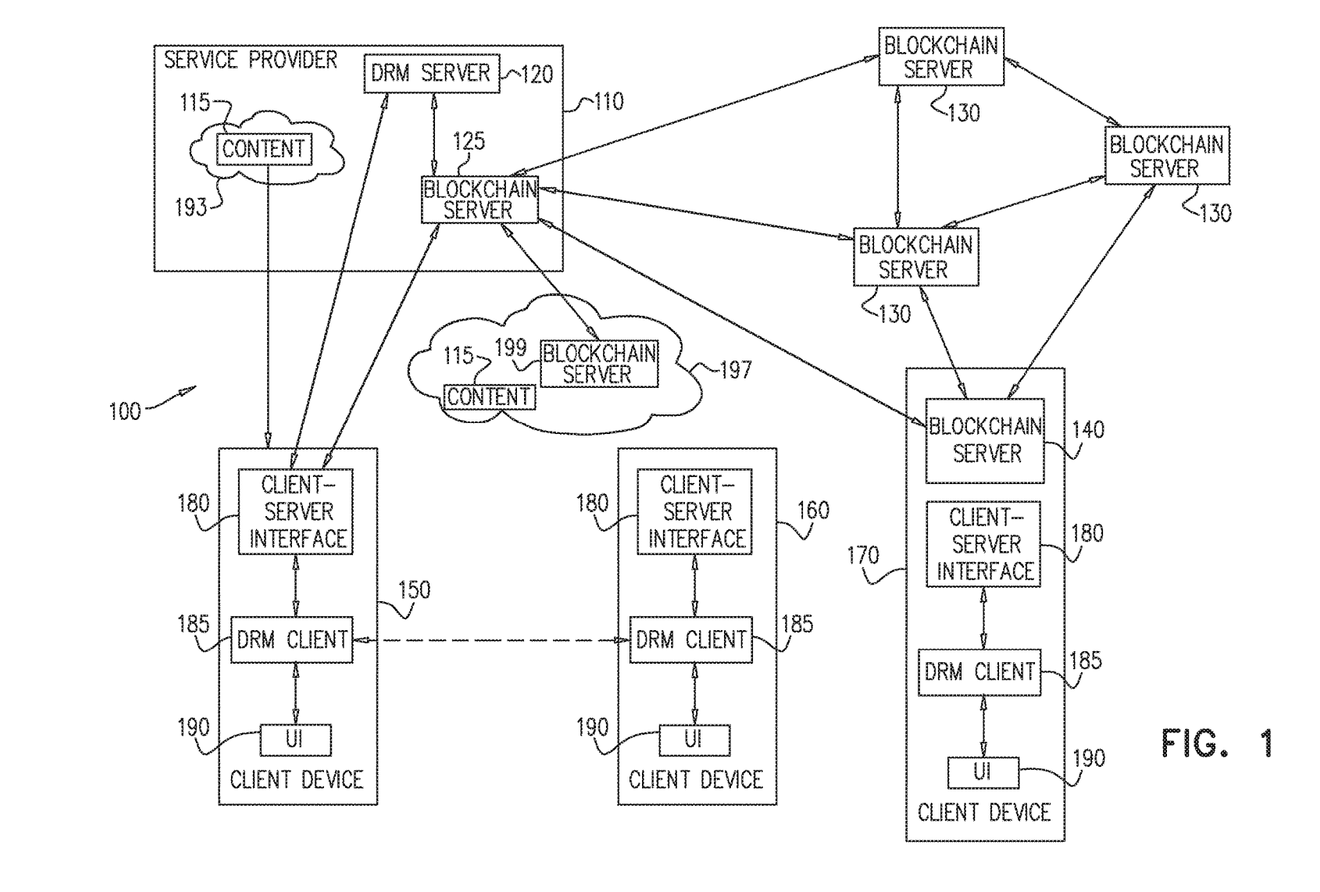
FIG. 1 is a simplified pictorial illustration of a system for content and service sharing with blockchains constructed and operative in accordance with an embodiment of the present invention.

Reference is now made to FIG. 1 which is a simplified pictorial illustration of a system 100 for content and service sharing with blockchains constructed and operative in accordance with an embodiment of the present invention. The system 100 of FIG. 1 comprises a service provider 110, the service provider 110 providing access to its subscribers to various types of content, such as content item 115. The service provider 110 further comprises a digital rights management (DRM) server 120, and a first blockchain server 125. The first blockchain server 125 is operatively associated with a plurality of other blockchain servers 130, 140, 199 as will be discussed below. Additionally, the system 100 of FIG. 1 comprises a plurality of client devices, such as first client device 150, second client device 160, and third client device 170.

Each of the client devices 150, 160, 170 comprises a client-server interface 180 for communication with the service provider 110, and more specifically the DRM server 120 and the first blockchain server 125. The client-server interface 180 may comprise separate interfaces for communications with the DRM server 120 and the first blockchain server 125 at the service provider 110, or may be a single interface operative to communicate with the DRM server 120 and the first blockchain server 125 of the service provider 110. Alternatively, the client-server interface 180 may comprise one set of hardware and processes which are dedicated to communication with the DRM server 120 and a second set of hardware and processes which are dedicated to communication with the first blockchain server 125. These two sets of hardware and processes may share some resources which are common to the hardware and processes of the client-server interface 180.

Each of the client devices 150, 160, 170 typically further comprise a DRM client 185, which communicates with the DRM server 120 of the service provider 110 via the client-server interface 180 of that client device 150, 160, 170. User input to the client device 150, 160, 170, and particularly user input which pertains to the operation of the DRM client 185 is via an appropriate user interface (UI) 190 disposed in each client device 150, 160, 170, as will be described below.

The client device 150, 160, 170 may attempt to obtain a piece of content, such as content item 115. The content item 115 may be obtained via a proprietary cloud 193, which is maintained by the service provider 110, or, alternatively, the content item 115 may be obtained via a public or proprietary cloud 197 which is not in the service provider's 110 domain.

It is noted that among the blockchain servers 130, 140, 199 with which the first blockchain server 125 is operatively associated, some of the other blockchain servers, such as blockchain server 140, may be disposed in one of the client devices, such as third client device 170. Additionally, some of the plurality of other blockchain servers may include blockchain server 199, which is located in the public or proprietary cloud 197, or other location, as is known in the art.

Figure 2:
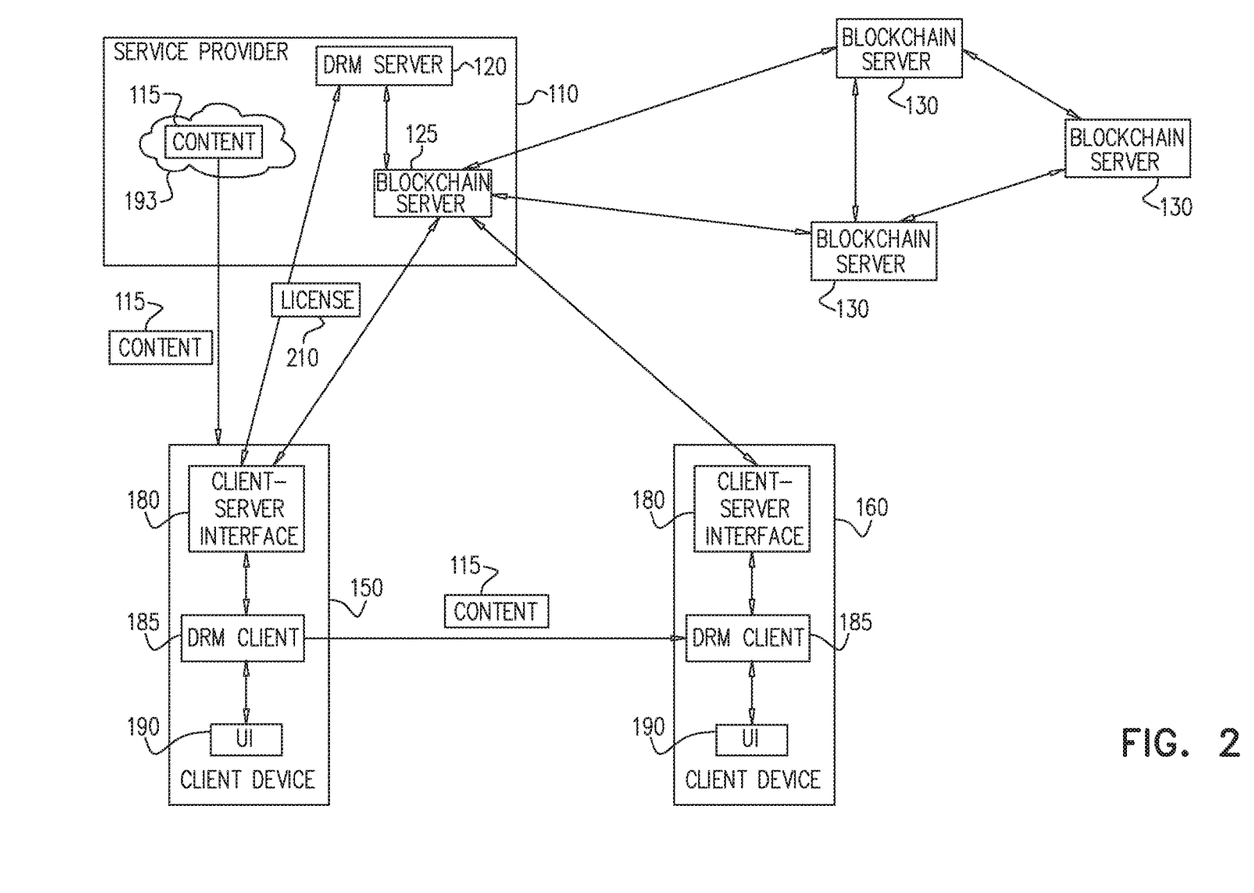
FIG. 2 is a depiction of data flow in a portion of the system of FIG. 1.

Reference is now made to FIG. 2, which is a depiction of data flow in a portion of the system 100 of FIG. 1. At a first stage of operation of the system 100 of FIG. 1, a user enters an instruction, via UI 190 on first client device 150, to purchase content item 115. As was briefly described above, it may be the case that the first client device 150 obtains both the content item 115 and a DRM license 210, which enables the consumption of the content item 115 on the first client device 150, from the service provider 110. Alternatively, the first client device 150 may obtain the content item 115 from another source, such as the cloud 197 of FIG. 1 (not depicted in FIG. 2), and the DRM license 210 from the service provider 110. In order to simplify the following discussion, it will be assumed that both the content item 115 and the DRM license 210 are both obtained from the service provider 110. Persons of skill in the art will appreciate that there is very little variation in the operation of the system of FIG. 1 regardless of the source of the content item 115.

The client-server interface 180 sends the request for the content item 115 to the service provider 110, and a request for the DRM license 210 to the DRM server 120. The DRM server 120 sends the DRM license 210 to the DRM client 185 of the client device 150, via the client-server interface 180. Additionally, the DRM server 120 sends a notification to the first blockchain server 125 so that the first blockchain server 125 adds a record in its blockchain that ownership, or a usage right (such as the DRM license 210), has been granted by the service provider 110 to the first client device 150. It is appreciated that, as is known in the art, when the first blockchain server 125 updates its blockchain, the first blockchain server 125 also synchronizes its blockchain with other blockchain servers 130, 140, 199.

The present discussion of the flow of data in the system 100 of FIG. 1 is briefly interrupted to discuss the DRM license 210. The DRM license 210 comprises the following information:

A device ID or a user ID with which the first client device 150 is associated;

A content item ID of the content item 115 with which the DRM license is associated;

A license expiry date—which may, in principle, be any given amount of time, or, alternatively, the license may never expire, in which case the license expiry date field may not be populated;

A decryption key which is used to decrypt the content item 115;

A blockchain ID which uniquely associates the blockchain to a single instance of the content item 115;

A block ID which identifies a block within the blockchain; and

Terms of use or ownership, which may include that the content item 115: may/may not be sold; may/may not be rented to a second user; may/may not be transferred to a second device; may/may not be given to a second user, and if given to a second user, for how long may it be given; and so forth; and Other relevant information, as is known in the art.

Returning to the discussion of FIG. 2, at a second stage, the user of the first client device 150 wishes to transfer the rights (i.e., rents, gives for a limited amount of time, or permanently transfers) to the content item 115 to the user of the second client device 160. Although the content item 115 is depicted in FIG. 2 as being sent from the first client device 150 to the second client device 160, the DRM client 185 on the second client device 160 may alternatively obtain the content item 115 from the service provider's 110 proprietary cloud 193, or still further alternatively, from the public or proprietary cloud 197 (FIG. 1) which is not in the service provider's 110 domain. At the same time, the DRM client 185 on the second client device 160 obtains the DRM license 210 from either one of the first blockchain server 125 or the DRM server 120.

At the time when the DRM license 210 is transferred from the client device 150 to the client device 160, one or both of the DRM clients 185 of the first and second client devices 150, 160 notify the DRM server 120 or the first blockchain server 125 at the service provider 110 that the license is to be transferred. The first blockchain server 125 confirms to the second client device 160 that the license to the content item 115 is legitimately held by the first client device 150. Upon confirmation, the first blockchain server 125 then records in its blockchain that the DRM license 210 has been granted to the second client device 160. As noted above, when the first blockchain server 125 updates its blockchain, the first blockchain server 125 also synchronizes its blockchain with other blockchain servers 130, 140, 199.

Should an attempt to consume the content item 115 be executed on the first client device 150, the DRM client 185 on the first client device 150 will contact one of the blockchain servers 125, 130, 140, 199 of FIG. 1 in an attempt to verify ownership of the content item 115. The DRM server 120 executes a query of the first blockchain server 125 blockchain, and determines that the first client device 150 does not, at the present time, hold a valid DRM license 210 to the content item. 115 The DRM server 120 will notify the DRM client 185 on the first client device 150 of the results of the query. Should the first client device 150 be entitled to a DRM license but not have a DRM license, the DRM server 120 will issue the DRM license to the first client device 150. Until such time as the first client device 150 has a valid DRM license, the DRM client 185 on the first client device 150 will not allow the content item 115 to be consumed. The DRM client 185 on the first client device 150 may present the user of the first client device 150, via the user interface 180, with an offer to purchase a valid license, or may display an on-screen display (OSD) indicating that, at the present time, the first client device 150 does not hold a license to the content item 115. The DRM client 185 may offer a preview of either the content item 115 itself, or another, possibly related content item (e.g., a prequel or sequel to the content item, or a content item with the same star(s), etc.), or may perform another action of the type of actions known in the art, when a valid license is lacking for consumption of a content item.

In some embodiments, prior to purchase of an instance of the content item 115, a potential purchaser will verify with one of the blockchain servers 125, 130, 140, 199 of FIG. 1, that the instance offered for sale is indeed owned by the potential seller of the instance of the content item for sale, and the potential seller, in fact has the right to sell the item. The same may be true to verify a rental/loan, swap, and so forth of one or more instances of a content item.

On the other hand, when an attempt is made to consume the content item 115 on the second client device 160, the DRM client 185 on the second client device 160 will contact the service provider 110 DRM server 120 in an attempt to verify ownership of the content item 115. The DRM server 120 will execute a query of the first blockchain server 125 blockchain, and determine that the second client device 160 owns a valid DRM license 210 to the content item 115. The DRM server 120 will notify the DRM client 185 on the second client device 160 of the results of the query. Accordingly, the DRM client 185 on the second client device 160 will play out (i.e. consume) the content item 115. Should the second client device 160 not have a valid DRM license 210 to the content item 115, then the DRM server may grant a license to the content according to a business arrangement between the owner of the client device 160 and the owner of the content or the service provider 110 (FIG. 1).

At still a later stage, either the owner of the second client device 160 returns the rights to the content item 115 (i.e., the DRM license 210) to the owner of the first client device 150, or the loan/rental of the DRM license 210 expires. Then in a mirror image of the description above, the first blockchain server 125 updates its blockchain so that the blockchain now indicates that the DRM license 210 has been granted to the second client device 160. As per the description above, the second client device 160 will now no longer be able to legitimately consume the content item 115, and the first client device 150 now is able to legitimately consume the content item 115. It is appreciated that, as is known in the art, when the first blockchain server 125 updates its blockchain, the first blockchain server 125 also synchronizes its blockchain with other blockchain servers 130, 140, 199.

The following table summarizes the above discussion.

TABLE 1

| STEP | CHANGE | FIRST CLIENT DEVICE 150 | SECOND CLIENT DEVICE 160 | BLOCKCHAIN |
|---|---|---|---|---|
| Initial State | | Cannot consume content item 115 | Cannot consume content item 115 | ... <SP 110 gave rights to content item XXX to user AAA>, <SP 110 gave rights to content item YYY to user BBB>, ... |
| User of first client device 150 buys content item 115 | Service Provider 110 creates initial ownership record for user of first client device 150 granting DRM license 210 | Can consume content item 115 | Cannot consume content item 115 | ... <SP 110 gave rights to content item XXX to user AAA>, <SP 110 gave rights to content item YYY to user BBB>, ... <SP 110 gave DRM license 210 to first client device 150> |
| User of second client device 160 buys content item 115 gives/rents/ etc. DRM license 210 to user of second client device 160 | User of first client device 150 transfers DRM license 210 to user of second client device 160 | Cannot consume content item 115 | Can consume content item 115 | ... <SP 110 gave rights to content item XXX to user AAA>, <SP 110 gave rights to content item YYY to user BBB>, ... <SP 110 gave DRM license 210 to first client device 150>, <User of first client device 150 gave DRM license 210 to user of second client device 160> |
| User of second client | User of second client | Can consume content item | Cannot consume | ... <SP 110 gave |

TABLE 1-continued

| STEP | CHANGE | FIRST CLIENT DEVICE 150 | SECOND CLIENT DEVICE 160 | BLOCKCHAIN |
|---|---|---|---|---|
| device 160 returns content to user of first client device 150 (or transfer expires) | device 160 transfers DRM license 210 to user of first client device 150 | 115 | content item 115 | rights to content item XXX to user AAA>, <SP 110 gave rights to content item YYY to user BBB>, ... <SP 110 gave DRM license 210 to first client device 150>, <User of first client device 150 gave DRM license 210 to user of second client device 160>, <User of second client device 160 gave DRM license 210 to user of first client device 150>, ... |

The first blockchain server 125 may, from time-to-time, execute a house cleaning routine which would delete expired blocks from the blockchain, so that the blockchain in the step of "User of second client device 160 returns content to user of first client device 150 (or transfer expires)", which appears above in Table 1 as:

...

<SP 110 gave rights to content item XXX to user AAA>,
<SP 110 gave rights to content item YYY to user BBB>,

...

<SP 110 gave DRM license 210 to first client device 150>,
<User of first client device 150 gave DRM license 210 to user of second client device 160>,
<User of second client device 160 gave DRM license 210 to user of first client device 150>, may eventually get housecleaned to:

...

<SP 110 gave rights to content item XXX to user AAA>,
<SP 110 gave rights to content item YYY to user BBB>,

...

<User of first client device 160 gave DRM license 210 to user of client device 150>,

...

Note that in the above discussion of Table 1, the abbreviation SP 110 is used as an abbreviation for service provider 110.

Figure 3:
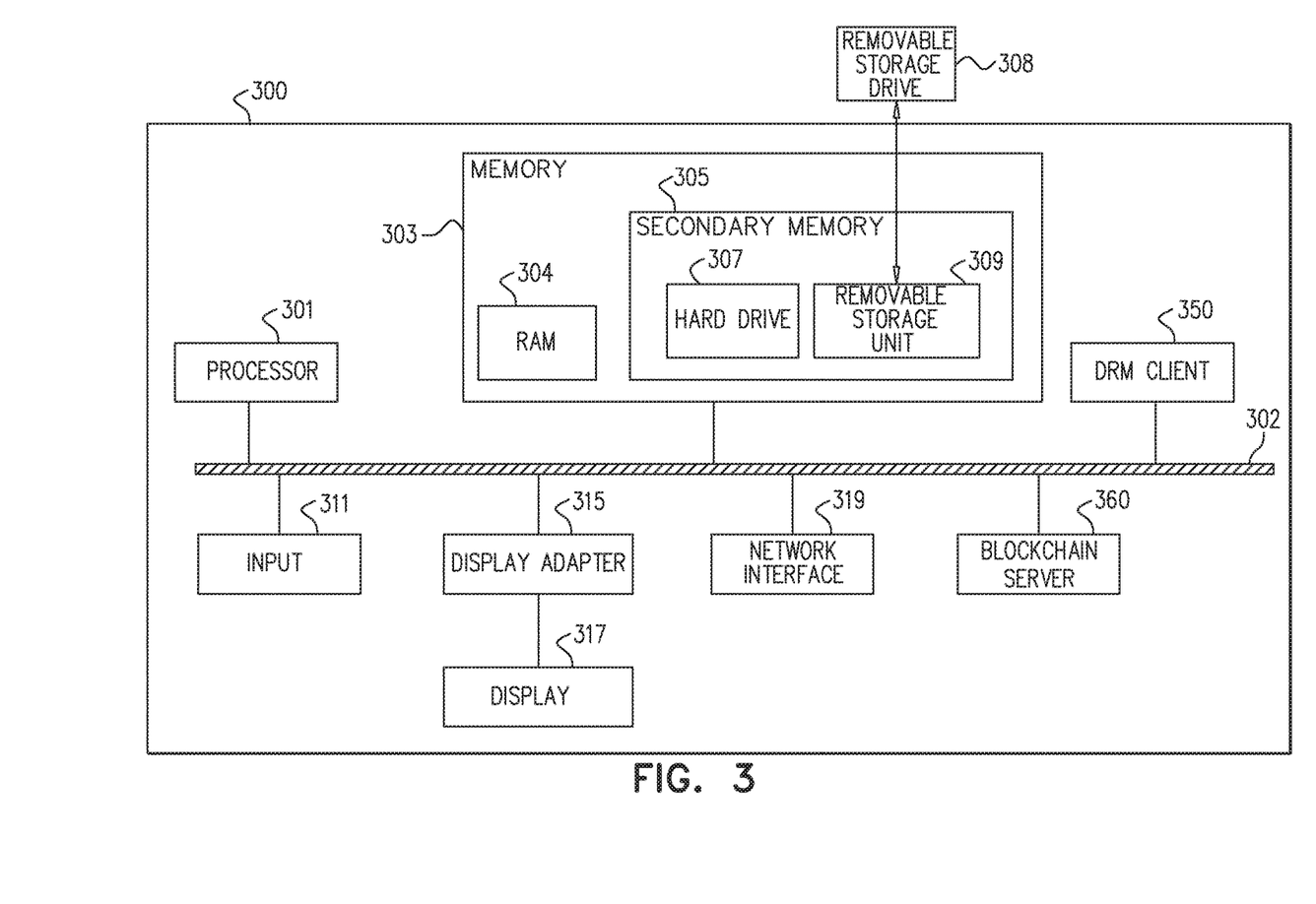
FIG. 3 is a block diagram of an exemplary client device used in the system of FIG. 1.

Reference is now made to FIG. 3, which is a block diagram of an exemplary client device 300 used in the system of FIG. 1. For example, any of the first client device 150, the second client device 160, or the third client device 170 may be according to the exemplary design as depicted in FIG. 3.

The exemplary device 300 is suitable for implementing any of the systems, methods or processes described above. The exemplary device 300 comprises one or more processors, such as processor 301, providing an execution platform for executing machine-readable instructions such as software. One of the processors 301 may be a special purpose processor operative to perform the method for piracy detection described herein above. Processor 301 comprises dedicated hardware logic circuits, in the form of an application-specific integrated circuit (ASIC), field programmable gate array (FPGA), or full-custom integrated circuit, or a combination of such devices. Alternatively, or additionally, some or all of the functions of the processor 301 may be carried out by a programmable processor microprocessor or digital signal processor (DSP), under the control of suitable software. This software may be downloaded to the processor in electronic form, over a network, for example. Alternatively, or additionally, the software may be stored on tangible storage media, such as optical, magnetic, or electronic memory media.

Commands and data from the processor 301 are communicated over a communication bus 302. The system 300 also includes a main memory 303, that may include: a Random Access Memory (RAM) 304, where machine-readable instructions may reside during runtime; and/or a secondary memory 305. The secondary memory 305 includes, for example, a hard disk drive 307 and/or a removable storage drive 308, representing a floppy diskette drive, a magnetic tape drive, a compact disk drive, a flash drive, etc., or a nonvolatile memory where a copy of the machine-readable instructions or software may be stored. The secondary memory 305 may also include ROM (read only memory), EPROM (erasable, programmable ROM), EEPROM (electrically erasable, programmable ROM). In addition to software, data representing the content item 115 or the DRM license 210 discussed herein throughout, and without limiting the generality of the foregoing, or other similar data, may be stored in the main memory 303 and/or the secondary memory 305. The removable storage drive 308 reads from and/or writes to a removable storage unit 309 in a well-known manner.

A user can interface with the exemplary device 300 via a user interface (including user interface (UI) 190 of FIG. 1) which includes input devices 311, such as a touch screen, a keyboard, a mouse, a stylus, and the like in order to provide user input data. A display adaptor 315 interfaces with the communication bus 302 and a display 317 and receives display data from the processor 301 and converts the display data into display commands for the display 317.

A network interface 319 is provided for communicating with other systems and devices via a network. The network interface 319 typically includes a wireless interface for communicating with wireless devices in the wireless community. A wired network interface (e.g. an Ethernet interface) may be present as well. The exemplary device 300 may also comprise other interfaces, including, but not limited to Bluetooth, and HDMI. The network interface may be a part of the client-server interface 180 of FIG. 1. Alternatively, the client-server interface 180 of FIG. 1 may comprise dedicated hardware and software, independent of the network interface 319.

The DRM client 350, the use of which is described above with reference to FIGS. 1 and 2, may be among the software and/or specialized hardware executed or controlled by the processor 301. Optionally, the exemplary device 300 may also comprise a blockchain server 360, such as blockchain server 140 of FIG. 1, which is depicted in the third client device 180. The blockchain server 140, 360, will be described below.

It will be apparent to one of ordinary skill in the art that one or more of the components of the exemplary device 300 may not be included and/or other components may be added as is known in the art. The exemplary device 300 shown in FIG. 3 is provided as an example of a possible platform that may be used, and other types of platforms may be used as is known in the art. One or more of the steps described above may be implemented as instructions embedded on a computer readable medium and executed on the exemplary device 300. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running a computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated above may be performed by any electronic device capable of executing the above-described functions.

The DRM server 120 of FIG. 1 will typically be similar to the client device 300 described above, but will typically not comprise the blockchain server 360 or the DRM client 350. It is, however, appreciated that there is no inherent limitation preventing the DRM server 120 of FIG. 1 from also comprising a DRM client, such as DRM client 350, or a blockchain server, such as blockchain server 360. The DRM server 120 of FIG. 1 will typically comprise, in addition to the elements described above, a database of DRM licenses, content items, and so forth. The DRM server 120 of FIG. 1 may also comprise other specialized hardware and software such as is known in the art.

The blockchain server 125, 130, 140, 199 (all of FIG. 1), 360, will typically be similar to the client device 300 described above, but will typically not comprise the DRM client 350. It is, however, appreciated that there is no inherent limitation preventing the blockchain server 125, 130, 140, 199 (all of FIG. 1), 360 from also comprising a DRM client, such as DRM client 350. The blockchain server 125, 130, 140, 199 (all of FIG. 1), 360 also comprises the secure blockchain database, as well as secure interfaces for communicating with the other blockchain servers 125, 130, 140, 199 (all of FIG. 1), 360.

It is appreciated that the user interface (UI) 190 of FIG. 1 includes a mechanism for transferring the DRM license 210 (FIG. 2) to another user. Transfer options may be presented in a menu or other appropriate mechanism, including:
- a mechanism to initiate a search for the second client device 160;
- a mechanism for selecting a particular content item to sell, lend, rent, give and so forth;
- a mechanism for transferring the DRM license 210 (FIG. 2) to the second client device 160 for an amount of time, if the particular content item to be transferred is to be rented or lent;
- a mechanism to set a playback limit—for example, if the user of the first client device 150 has purchased a license for 4 playbacks of the content item 115, the user of the first client device 150 may be willing to sell, lend, give, etc. one (but not more than one), by way of example only, of those four playbacks to the user of the second client device 160;

a mechanism to accept the DRM license upon transfer; and so forth.

Figure 4:
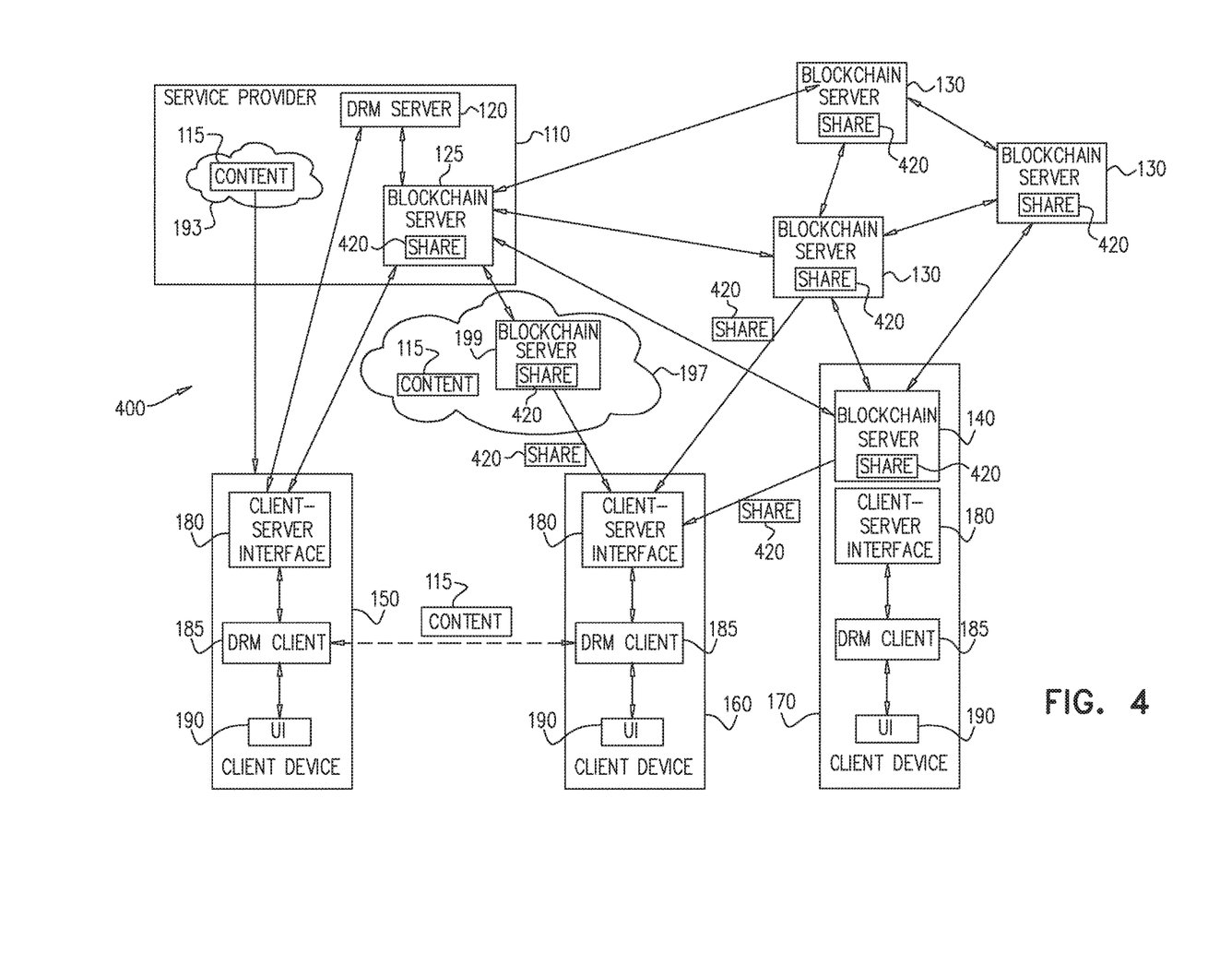
FIG. 4 is a depiction of an alternative embodiment of the system of FIG. 1.

Reference is now made to FIG. 4, which is a depiction 400 of an alternative embodiment of the system of FIG. 1. In some alternative embodiments of the system of FIG. 1, a "k of n" secret sharing scheme is used. In such an embodiment, n shares 420 (or parts) of different parts of the decryption key which is used to decrypt the content item 115 are distributed to each of the blockchain servers 125, 130, 140, 199. Thus, each of the blockchain servers 125, 130, 140, 199 have the DRM license 210 (FIG. 2) in their blockchain, as described above, however, instead of having a complete copy of the decryption key which is used to decrypt the content item 115, a portion of the decryption key is comprised in the DRM license 210 (FIG. 2). In order to decrypt the content item 115, in such an embodiment, at least k shares of the n total shares are used.

Accordingly, when the second client device 160 receives the rights to view the content item 115 (depicted here as if the content item 115 itself were moving from the first consumer device 150 to the second consumer device 160), the second client device 160 receives at least k of the n shares distributed among the various blockchain servers 125, 130, 140, 199. For example, in FIG. 4, six instances of share 420 are depicted in the various blockchain servers 125, 130, 140, 199. That is to say: n=6. One instance of blockchain server 130, as well as blockchain server 140 and blockchain server 199 are depicted as sending their "share" 420 (i.e., their version of the DRM license 210 (FIG. 2), which includes one portion of the decryption key) to the second client device 160. However, once the second client device 160 receives the three "shares" 420 (k=3), it will be able to combine all three shares 420 in such a fashion as to be able to decrypt the content item 115.

Techniques for sharing a secret by dividing it into portions are known in cryptography, and are described, for example, in Shamir, Adi (1979), "How to share a secret", Communications of the ACM, 22 (11): 612-613. Dividing and delivering the decryption key might use a larger amount of communications resources than might be used if there was one version of the decryption key. On the other hand, an attack whereby a single server and single compromised client could extract all decryption keys for all content item items 115 is largely prevented. Additionally, using an embodiment where the decryption key is divided up into multiple portions enhances traceability as several blockchain servers 125, 130, 140, 199 have visibility to a rendering operation, and could audit the transactions to prevent abuse.

In some embodiments the blockchain servers 125, 130, 140, 199 comprise time servers which are able to provide the DRM client 185 with secure time. As is known in the art, it is useful in DRM to know the correct time, in order to know when a license is still valid and when the license has expired. Having the DRM client 185 connect to the blockchain servers 125, 130, 140, 199 can help provide the DRM client 185 with a trusted source of time. An attacker might be able to compromise one or more servers among the blockchain servers 125, 130, 140, 199, but given the security surrounding each of the blockchain servers 125, 130, 140, 199, it is highly unlikely that the attacker will successfully compromise enough servers among the blockchain servers 125, 130, 140, 199 to fool the DRM client 185. This is particularly true in a "k of n" embodiment, where a number of the blockchain servers 125, 130, 140, 199 would have to provide the same time for the DRM client 185 to rely on the time provided. Accordingly, a message received at the DRM client 185 from one of the blockchain servers 125, 130, 140, 199 comprising a time stamp may be used by the DRM client 185 as a secure timestamp.

The simple case of a loan in the non-virtual world is where a lender gives a book (or a CD of a movie) to a borrower, and the borrower decides when to return the book (or the CD). However, in embodiments described herein, the lender (i.e., the user of client device 150) can also "take back" the digital item when needed. For example, the lender may issue a command through the user interface 190 to retrieve the content item 115 back from the borrower (i.e. the user of client device 160). This embodiment will support a loan such as "This eBook is yours for 30 days, unless I need it sooner". This embodiment can also support an escrow service by which a seller gives the sold content item 115 to the buyer, but if the buyer's payment does not clear, the seller will be able to retrieve the sold content item 115.

In some embodiments where the owner is able to pre-emptively cancel a loan of the content item 115 before the period of the loan ends, the lender may use the user interface 190 to have the DRM client 185 send a revocation message to one of the DRM servers 125, 130, 140, 199. The original transfer of the DRM license may include a flag or other indication that the DRM client 185 may (or may not) send such a revocation message to one of the of the DRM servers 125, 130, 140, 199.

In still another embodiment, if an owner of the content item 115 loans the content item 115 to two or more people, then one of the loaned copies of the content item 115 will continue to operate. In some embodiments, the originally loaned content item will continue to operate. Alternatively, the last loaned copy will copy which continues to operate.

Alternatively, if the terms of the original DRM license 210 are such that, for example, the content item may be consumed four times, (for example, a movie may be watched four times under the terms of such a DRM 210 license) the original holder of the license (i.e. the user of client device 150) may simultaneously lend out up to four copies of the content item 115, each one of which may be consumed once. It is appreciated that one of those four copies would be in lieu of the user of client device 150 maintaining his or her copy of the DRM license 210. In such a case, a block in the blockchain which indicates that the DRM license is for up to four copies of the content item 115 may spawn up to three child blocks.

Figure 5:
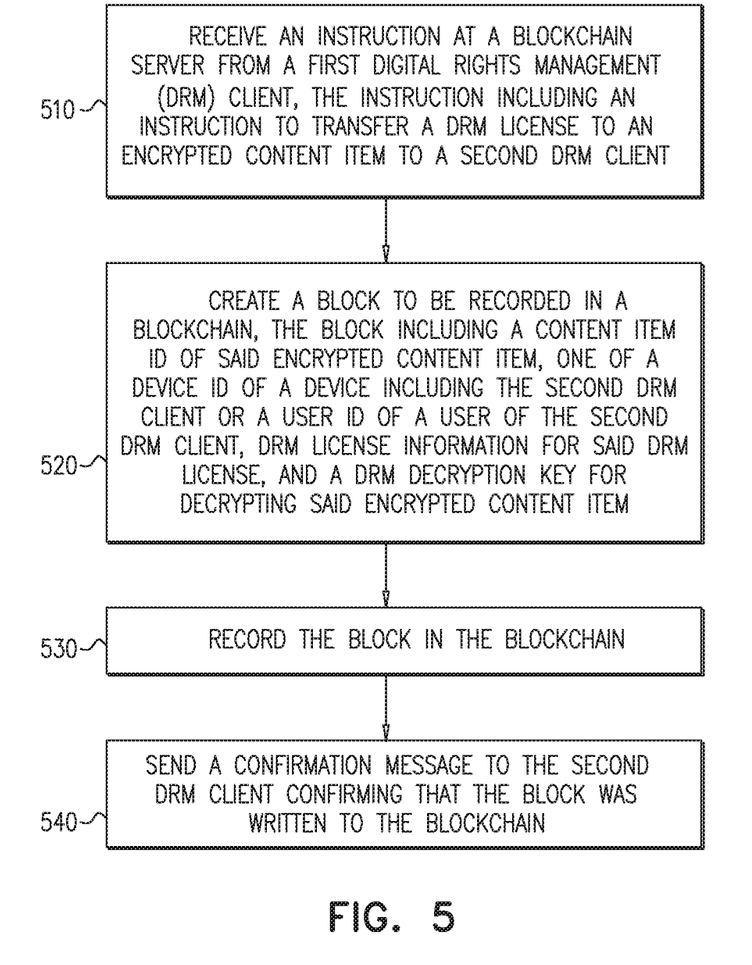
FIG. 5 is a simplified flow chart of one method for implementing the system of FIG. 1.

Reference is now made to FIG. 5, which is a simplified flow chart of one method for implementing the system of FIG. 1. FIG. 1 is also additionally referred to as well. At step 510, and instruction is received from a first digital rights management (DRM) client 150 at a blockchain server 125. The instruction comprises an instruction to transfer a DRM license to an encrypted content item 115 to a second DRM client 160.

At step 520, a block to be recorded in a blockchain is created, the block including a content item ID of said encrypted content item 115, one of a device ID of a device including the second DRM client 160 or a user ID of a user of the second DRM client 160, DRM license information for said DRM license and a DRM decryption key for decrypting said encrypted content item. The block is recorded in the blockchain (step 530).

At step 540, a confirmation message is sent to the second DRM client 160 confirming that the block was written to the blockchain.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and equivalents thereof:

What is claimed is:

1. A method comprising:
    receiving an instruction at a blockchain server from a first digital rights management (DRM) client, the instruction comprising an instruction to transfer a DRM license to an encrypted content item to a second DRM client;
    creating a block to be recorded in a blockchain, the block comprising:
        a content item ID of the encrypted content item;
        one of a device ID of a device comprising the second DRM client or a user ID of a user of the second DRM client;
        DRM license information for the DRM license; and
        a DRM decryption key for decrypting the encrypted content item;
    recording the block in the blockchain;
    synchronizing the blockchain with a plurality of blockchain servers, wherein synchronizing the blockchain comprises providing a distinct portion of the DRM decryption key to each of the plurality of blockchain servers; and
    sending a confirmation message to the second DRM client confirming that the block was written to the blockchain.

2. The method according to claim 1 wherein the block further comprises a blockchain ID.

3. The method according to claim 1 wherein the instruction to transfer the DRM license to the second DRM client comprises an instruction to transfer the DRM license for a limited amount of time.

4. The method according to claim 1 wherein the instruction to transfer the DRM license to the second DRM client comprises an instruction to permanently transfer the DRM license.

5. The method according to claim 1 wherein the DRM license comprises a license expiration date.

6. The method according to claim 1 wherein the decryption key comprises one share of different parts of the decryption key, wherein the one share is used in combination with at least one other share to decrypt the encrypted content item.

7. The method according to claim 1 further comprising receiving a revocation message from the first device cancelling the DRM license of the second DRM client.

8. The method according to claim 7 wherein the revocation message is received prior to an expiration date of the DRM license transferred to the second DRM client.

9. The method according to claim 7 wherein the instruction to transfer the DRM license to the second DRM client includes an indication that the first DRM client may send a revocation message.

10. The method according to claim 1 further comprising sending a message to at least one of the first DRM client and the second DRM client, the message comprising a secure time stamp.

11. The method according to claim 1 wherein the DRM license comprises a license for a fixed number of uses of the content item, and the receiving step may be repeated up to the fixed number of times.

12. The method according to claim 11 wherein the step of recording the block in the blockchain comprises recording a child block for each repetition of the receiving step.

13. The method according to claim 1 wherein the blockchain server is comprised at a service provider.

14. The method according to claim 1 wherein the blockchain server is comprised at a client device.

15. The method according to claim 1 wherein the blockchain server is comprised in a cloud server.

16. A system comprising:
    a blockchain server operative to receive an instruction at a network interface, the instruction being received from a first digital rights management (DRM) client, the instruction comprising an instruction to transfer a DRM license to an encrypted content item to a second DRM client,
    a blockchain, in which the blockchain server is operative to create a block, the block comprising:
        a content item ID of the encrypted content item;
        one of a device ID of a device comprising the second DRM client or a user ID of a user of the second DRM client;
        DRM license information for the DRM license; and
        a DRM decryption key for decrypting the encrypted content item;
    wherein the blockchain server is operative to record the block in the blockchain and synchronize the blockchain with a plurality of blockchain servers, wherein the blockchain server being operative to synchronize the blockchain comprises the blockchain server being operative to provide a distinct portion of the DRM decryption key to each of the plurality of blockchain servers; and
    the blockchain server is operative to send a confirmation message to the second DRM client confirming that the block was written to the blockchain.

17. The system according to claim 16 wherein the instruction to transfer the DRM license to the second DRM client comprises an instruction to transfer the DRM license for a limited amount of time.

18. The system according to claim 16 wherein the instruction to transfer the DRM license to the second DRM client comprises an instruction to permanently transfer the DRM license.

19. The system according to claim 16 wherein the DRM license comprises a license expiration date.

20. A method comprising:
    receiving a confirmation message at a first DRM client from one of a plurality of blockchain servers when a block is recorded in a blockchain by one of the plurality of blockchain servers, the confirmation message confirming that a DRM license that was legitimately held by a second DRM client has been transferred to the first DRM client, wherein the DRM license comprises a license to an encrypted content item and a decryption key for decrypting the encrypted content item, wherein the decryption key comprises a plurality of shares, each of the plurality of shares distributed on the plurality of blockchain servers;

decrypting the encrypted content item using the decryption key; and consuming the decrypted content item, wherein the block comprises:
- a content item ID of the encrypted content item;
- one of a device ID of a device comprising the first DRM client or a user ID of a user of the first DRM client;
- DRM license information for the DRM license; and
- the decryption key.

* * * * *